United States Patent
Han et al.

(10) Patent No.: US 10,403,213 B2
(45) Date of Patent: Sep. 3, 2019

(54) CRADLE AND DISPLAY DEVICE HAVING THE SAME

(71) Applicant: SAMSUNG DISPLAY CO., LTD., Yongin-si, Gyeonggi-do (KR)

(72) Inventors: Songyi Han, Asan-si (KR); Jin-won Jang, Asan-si (KR); Jin-taek Hong, Hwaseong-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 44 days.

(21) Appl. No.: 15/435,496

(22) Filed: Feb. 17, 2017

(65) Prior Publication Data

US 2017/0372665 A1 Dec. 28, 2017

(30) Foreign Application Priority Data

Jun. 22, 2016 (KR) ........................ 10-2016-0078196

(51) Int. Cl.
*G06F 1/16* (2006.01)
*H02J 7/00* (2006.01)
(Continued)

(52) U.S. Cl.
CPC ......... *G09G 3/3406* (2013.01); *G06F 1/1626* (2013.01); *G06F 1/1632* (2013.01); *G06F 1/1654* (2013.01); *G06F 1/26* (2013.01); *G09G 3/2092* (2013.01); *G09G 3/2096* (2013.01); *H02J 7/0021* (2013.01);
(Continued)

(58) Field of Classification Search
CPC ........ G06F 1/16; G06F 1/1632; G06F 1/1647; G06F 1/1654; G06F 3/0416; G06F 3/1423; G06F 13/4081; G06F 1/1656; G06F 1/1626; G06F 1/26; H04N 2201/005; H02J 7/0044; H02J 7/0042; H02J 7/0068; H02J 7/0024; H02J 7/355; H02J 7/0021; H02J 7/0027; H02J 3/0079; H02J 3/14; H02J 2007/0049; H02J 2007/0096;
(Continued)

(56) References Cited

U.S. PATENT DOCUMENTS

| | | | |
|---|---|---|---|
| 6,791,528 B2 * | 9/2004 | Adler | G06F 1/1601 340/815.4 |
| 8,675,356 B2 * | 3/2014 | Strauser | G06F 1/1632 361/679.4 |

(Continued)

FOREIGN PATENT DOCUMENTS

| | | |
|---|---|---|
| KR | 10-1002325 B1 | 12/2010 |
| KR | 10-2013-0077090 A | 7/2013 |

(Continued)

*Primary Examiner* — Dismery Mercedes
(74) *Attorney, Agent, or Firm* — Lee & Morse, P.C.

(57) ABSTRACT

A cradle according to an embodiment may include a housing to be coupled to display modules having various sizes and a light source driver inside the housing. The light source driver may generate a first driving voltage and a second driving voltage to be provided to a light source of the display module coupled to the housing. When the display module has a first size, the light source driver may supply only the first driving voltage to the display module. When the display module has a second size, larger than the first size, the light source driver outputs both the first and second driving voltages to the display module.

23 Claims, 14 Drawing Sheets

(51) Int. Cl.
*G09G 3/34* (2006.01)
*G06F 1/26* (2006.01)
*H02J 7/35* (2006.01)
*H04B 1/3877* (2015.01)
*G09G 3/20* (2006.01)

(52) U.S. Cl.
CPC .......... *H02J 7/0027* (2013.01); *H02J 7/0044* (2013.01); *H02J 7/355* (2013.01); *H04B 1/3877* (2013.01); *G09G 2320/0626* (2013.01)

(58) Field of Classification Search
CPC .. G09G 3/2092; G09G 3/2096; G09G 3/3406; H04B 1/3877
See application file for complete search history.

(56) References Cited

U.S. PATENT DOCUMENTS

| | | | | |
|---|---|---|---|---|
| 9,768,816 | B2* | 9/2017 | Kaye | H04B 1/3877 |
| 9,853,489 | B2* | 12/2017 | He | H02J 7/0036 |
| 10,033,207 | B2* | 7/2018 | Mecca | H02J 7/0044 |
| 2003/0161099 | A1* | 8/2003 | Aoki | E05B 73/0082 |
| | | | | 361/679.29 |
| 2004/0104885 | A1* | 6/2004 | Adler | G06F 1/1601 |
| | | | | 345/102 |
| 2004/0150944 | A1* | 8/2004 | Byrne | H02J 7/0003 |
| | | | | 348/207.99 |
| 2009/0167634 | A1* | 7/2009 | Han | G06F 1/1601 |
| | | | | 345/1.3 |
| 2011/0037428 | A1* | 2/2011 | Sakaguchi | G06F 1/1632 |
| | | | | 320/107 |
| 2011/0080342 | A1* | 4/2011 | Haren | G06F 3/038 |
| | | | | 345/163 |
| 2011/0216495 | A1* | 9/2011 | Marx | H05K 5/02 |
| | | | | 361/679.22 |
| 2011/0321116 | A1 | 12/2011 | Liu et al. | |
| 2012/0106069 | A1* | 5/2012 | Strauser | G06F 1/1632 |
| | | | | 361/679.41 |
| 2013/0109371 | A1* | 5/2013 | Brogan | G06F 1/1626 |
| | | | | 455/420 |
| 2013/0191781 | A1* | 7/2013 | Radakovitz | G06F 3/0482 |
| | | | | 715/810 |
| 2014/0075075 | A1* | 3/2014 | Morrill | G06F 1/1632 |
| | | | | 710/303 |
| 2014/0146085 | A1* | 5/2014 | Takeda | G06F 1/1632 |
| | | | | 345/648 |
| 2015/0229751 | A1* | 8/2015 | Scott | H04W 76/14 |
| | | | | 455/414.1 |
| 2015/0318898 | A1* | 11/2015 | Jurgovan | H04B 5/0031 |
| | | | | 455/41.1 |
| 2015/0331463 | A1* | 11/2015 | Obie | G06F 1/1632 |
| | | | | 713/300 |
| 2016/0218535 | A1* | 7/2016 | Prete | H02J 7/0044 |
| 2017/0090530 | A1* | 3/2017 | Filser | H02J 7/0045 |
| 2017/0099071 | A1* | 4/2017 | Kaye | H04B 1/3877 |
| 2017/0220069 | A1* | 8/2017 | Lin | G06F 1/1632 |
| 2017/0227986 | A1* | 8/2017 | Ent | G06F 1/1632 |

FOREIGN PATENT DOCUMENTS

| | | |
|---|---|---|
| KR | 10-2015-0116940 A | 10/2015 |
| KR | 10-1615136 B1 | 4/2016 |

* cited by examiner

CRADLE AND DISPLAY DEVICE HAVING THE SAME

CROSS-REFERENCE TO RELATED APPLICATION

Korean Patent Application No. 10-2016-0078196, filed on Jun. 22, 2016, in the Korean Intellectual Property Office, and entitled: "Cradle and Display Device Having the Same," is incorporated by reference herein in its entirety.

BACKGROUND

1. Field

The present disclosure herein relates to a cradle and a display device, and more particularly, to a cradle which may be coupled to display modules with various sizes and a display device having the same.

2. Description of the Related Art

A display device is used for displaying an image for various information processing devices such as a TV, a monitor, a laptop computer, and a mobile phone. Recently, not only display devices with a flat display module, but also display devices with a curved display module, are being developed.

SUMMARY

An embodiment provides a cradle which may include a housing coupled to any one of display modules having various sizes and a light source driver inside the housing. The light source driver may generate first and second driving voltages to be provided to a light source of the display module coupled to the housing, wherein, when a first state in which the housing is coupled to a first display module having a first size among the display modules, the light source driver operates in s first mode in which the first driving voltage is output to a first light source of the first display module, and, when a second state in which the housing is coupled to a second display module, among the display modules, having a second size larger than the first size, the light source driver is to operate in a second mode in which the first driving voltage is output to a second light source of the second display module, and the second driving voltage is output to a third light source of the second display module. The light source driver may include a first light source driving circuit to generate the first driving voltage and a second light source driving circuit to generate the second driving voltage.

In an embodiment, in the case of the first state, an output terminal of the second light source driving circuit may be opened.

In an embodiment, the cradle may further include a first connector electrically connected to the first light source driving circuit and the second light source driving circuit, wherein the driving voltage is transmitted to the light source through the first connector.

In an embodiment, the cradle may further include a first connector electrically connected to the first light source driving circuit, and transmits the first driving voltage to the first light source or the second light source; and a second connector which is electrically connected to the second light source driving circuit, and transmits the second driving voltage to the third light source.

In an embodiment, the cradle may further include: a first connector which is electrically connected to the first light source driving circuit and the second light source driving circuit; and a second connector which is electrically connected to the first light source driving circuit and the second light source driving circuit.

In an embodiment, the first light source driving circuit and the second light source driving circuit may be disposed on the same printed circuit board.

In an embodiment, the first light source driving circuit may be disposed on a first printed circuit board, and the second light source driving circuit may be disposed on a second printed circuit board separated from the first printed circuit board.

In an embodiment, the second printed circuit board may be detachably coupled to the housing.

In an embodiment, the first light source driving circuit and the second light source driving circuit may receive a same enable signal.

In an embodiment, the light source driver may further include a determination unit which receives a size information signal from the display module coupled to the housing and generates a first enable signal and a second enable signal on the basis of the size information signal, and the first light source driving circuit receives the first enable signal to output the first driving voltage, and the second light source driving circuit receives the second enable signal to output the second driving voltage.

An embodiment provides a cradle including: a housing coupled to a display module having a light source; a first light source driving circuit disposed inside the housing, and to output a first driving voltage to the light source; and a second light source driving circuit inside the housing, and which does not supply a second driving voltage to the light source when the display module has a first size, and supplies the second driving voltage to the light source when the display module has a second size larger than the first size.

In an embodiment, the cradle may further includes a connector electrically connected to the first light source driving circuit and the second light source driving circuit, wherein, when the display module has the first size, the light source is electrically connected to the first light source driving circuit, and the light source is electrically disconnected from the second light source driving circuit, and when the display module has the second size, one part of the light source is electrically connected to the first light source driving circuit, and the other part of the light source is electrically connected to the second light source driving circuit.

An embodiment provides a display device including: a display module having a light source; and a cradle which switches between a coupled state in which the cradle is coupled to the display module and an uncoupled state in which the cradle is uncoupled from the display module, and include a light source driver to generate a first driving voltage and a second driving voltage. The display device operates, according to the size of the display module coupled to the cradle, in either of a first mode in which the second driving voltage is electrically connected to the light source to output the second driving voltage to the light source, or a second mode in which the second driving voltage is not output to the light source. The light source driver may include a first light source driving circuit to generate the first driving voltage and a second light source driving circuit to generate the second driving voltage, wherein the second light source driving circuit is electrically connected to the light source in the first mode and is electrically disconnected from the light source in the second mode.

In an embodiment, the display module may be either of a first display module which has a first size and includes a first light source, or a second display module which has a second size larger than the first size, and includes a second light source and a third light source.

In an embodiment, while the first display module is coupled to the cradle, the display device may be in the second operation state in which the first light source driving circuit outputs the first driving voltage to the first light source, and the second light source driving circuit is electrically disconnected from the first light source.

In an embodiment. while the second display module is coupled to the cradle, the first light source driving circuit may be electrically connected to the second light source to output the first driving voltage to the second light source, and the second light source driving circuit may be electrically connected to the third light source to output the second driving voltage to the third light source.

In an embodiment, the second light source and the third light source may be on a single printed circuit board.

In an embodiment, the second light source may be on a first printed circuit board, and the third light source may be on a second printed circuit board separated from the first printed circuit board.

In an embodiment, the first light source driving circuit may be on a first printed circuit board, the second light source driving circuit may be on a second printed circuit board separated from the first printed circuit board, and the second printed circuit board may be detachably coupled to the cradle.

In an embodiment, the display module may have any one of a flat shape and a curved shape.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
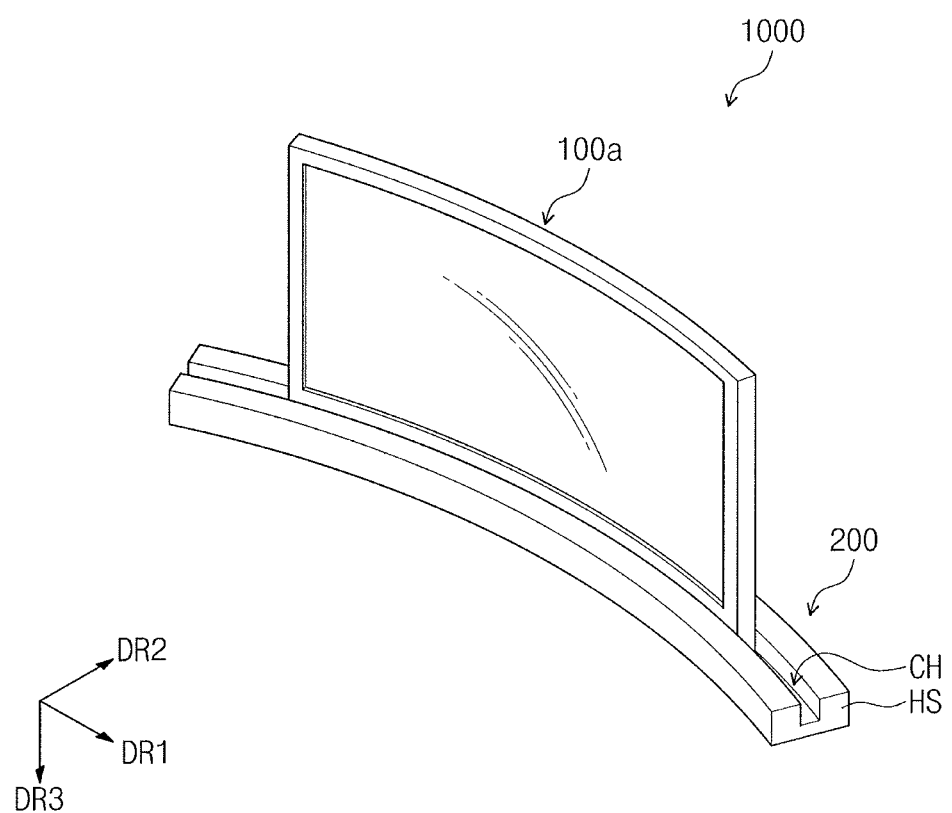
FIG. 1A illustrates a schematic perspective view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In addition, elements that are not related to the embodiments are omitted in the drawings for clarity of description, and the same reference numerals are used for the similar elements through the specification.

Figure 1B:
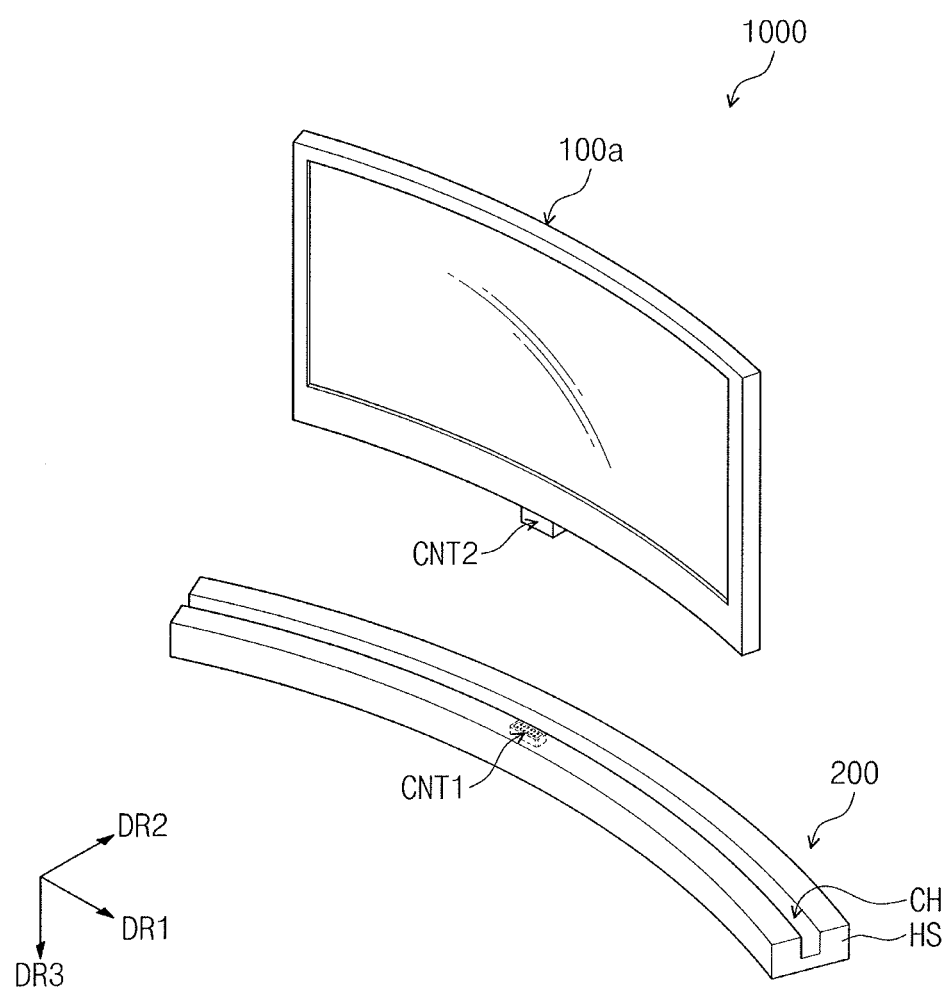
FIG. 1B illustrates an schematic perspective view of a display device according to an embodiment.
Figure 1C:
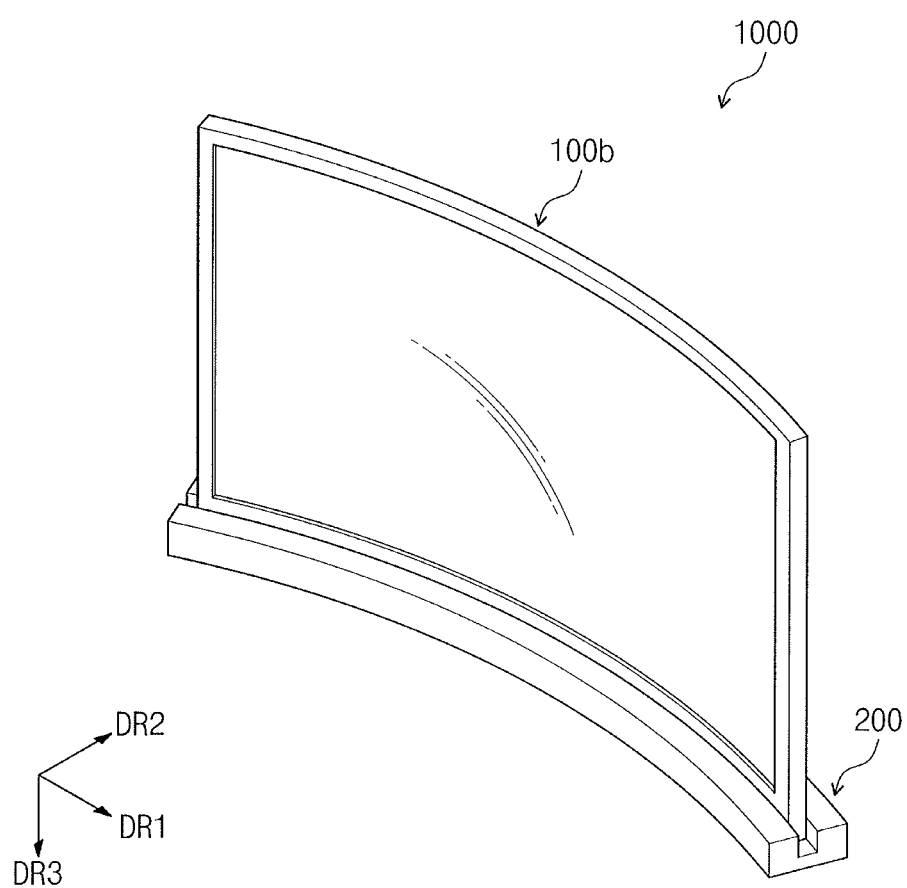
FIG. 1C illustrates a schematic perspective view of a display device according to an embodiment.

FIG. 1A is a perspective view schematically illustrating a display device according to an embodiment. FIG. 1B is an exploded perspective view schematically illustrating a display device according to an embodiment. FIG. 1C is a perspective view schematically illustrating a display device according to an embodiment.

Referring to FIGS. 1A, 1B, and 1C, a display device 1000 according to embodiments may include a cradle 200, and a display module (100a or 100b) for displaying an image.

The single cradle 200 may be coupled to the display modules having various sizes. For example, the display modules having various sizes may include a first display module 100a and a second display module 100b which have different sizes from each other. The cradle 200 may be coupled to the first display module 100a or the second display module 100b.

In the embodiment, the single cradle 200 is exemplarily illustrated as being coupled to any one of the first display module 100a and the second display module 100b, but is not limited thereto. The single cradle 200 may also be coupled to any one of three or more display modules having various sizes.

Each of the first display module 100a and the second display module 100b may include a display panel for displaying an image and a light source unit for supplying light to the display panel for displaying an image. In the embodiment, each of the first display module 100a and the second display module 100b may be a liquid crystal display panel, but are not limited thereto.

The first display module 100a may have a first size and the second display module 100b may have a second size, larger than the first size. When sizes of the display modules differ, sizes of light source units therein may be different from each other. Accordingly, driving voltages required by the light source unit of the first display module 100a and that of the second display module 100b may be different from each other. As used herein, the first size and second size may refer to size ranges, not a single size value.

According to an embodiment, the cradle 200 may include a light source driving unit 230 (see FIG. 3) for supplying voltages to the light source unit of the first display module 100a or the light source unit of the second display module 100b coupled to the cradle 200. The light source driving unit 230 may include a first light source driving circuit 231 and a second light source driving circuit 232. The first light source driving circuit 231 may output a driving voltage to the light source unit of the display module irrespective of the size of the display module coupled to the cradle 200. The second light source driving circuit may output a driving voltage to the light source unit or is electrically disconnected from the light source unit according to the size of the display module coupled to the cradle 200.

Being electrically disconnected from the light source unit may mean that an output terminal of the second light source driving circuit is opened. Accordingly, the voltage generated by the second light source driving circuit may not be transmitted to the light source unit.

A display device 1000 may switch between a coupled state and an uncoupled state. While in the coupled state, the first display module 100a or the second display module 100b may be coupled to the cradle 200. A state in which the cradle 200 and the first display module 100a are coupled is defined as a first state, and a state in which the cradle 200 and the second display module 100b are coupled is defined as a second state. While in the uncoupled state, the first display module 100a or the second display module 100b may be uncoupled from the cradle 200. Accordingly, since the first display module 100a and the second display module 100b may be uncoupled from the cradle 200, the cradle 200, and the first display module 100a and the second display module 100b may be separately managed.

The cradle 200 may include a housing HS, an electric module 220A (see FIG. 2)), and a connector CNT1. According to an embodiment, since the display device 1000 includes, in the cradle 200, the electric module 220A for driving the display module, the display modules to be coupled thereto may be slimmed down.

The electric module 220A may be inside the housing HS. The connector CNT1 may be electrically connected to the electric module and be exposed outside the housing HS.

Each of the display module to be coupled to the cradle 200 may include a connector CNT2 for receiving a signal from the connector CNT1. For example, the connector CNT1 of the cradle 200 and the connector CNT2 of the first display module 100a may be mutually coupled.

In FIG. 1B, the cradle 200 is exemplarily illustrated as being electrically connected with the first display module 100a through the connectors CNT1 and CNT2, in which the connector CNT2 in the display module protrudes from a bottom facing the cable 200 to be inserted in to the connector CNT1 in a coupling groove CH of the cradle 200, but embodiments are not limited thereto. Each of the connectors CNT1 and CNT2 may be modified into various forms having a structure capable of transmitting a signal.

The coupling groove CH to which the first display module 100a or the second display module 100b is coupled may be provided in the housing HS. The coupling groove CH may have a concave shape in a thickness direction DR3 from the top surface of the housing HS. The coupling groove CH may have a curved shape with respect to a first direction DR1. Accordingly, the first display module 100a coupled to the cradle 200 and the second display module 100b coupled to the cradle 200 may have a curved shape.

The first display module 100a and the second display module 100b may be curved concavely in a direction DR2 in which the display device 1000 is viewed by a user. However, the first display module 100a and the second display module 100b are not limited thereto, and may be curved convexly in the direction DR2 in which the display device 1000 is viewed by a user.

Each of the first display module 100a and the second display module 100b provides a user with a display region having a curved shape. Accordingly, the display device 1000 may provide an image having an improved sense of depth, immersion, and realism.

Each of the first display module 100a and the second display module 100b may be rigid or flexible. When rigid, the first display module 100a and the second display module 100b may maintain a curved shape even when the first display module 100a and the second display module 100b are uncoupled from the cradle 200. When flexible, the first display module 100a and the second display module 100b may have a flat shape when the first display module 100a and the second display module 100b are uncoupled from the cradle 200. In other words, when the flat first display module 100a and the flat second display module 100b are bent to be coupled to the cradle 200, the first display module 100a and the second display module 100b may maintain a curved state while coupled to the cradle 200.

However, this is an example, and embodiments are not limited thereto. For example, the coupling groove CH may have a linear shape, e.g., a shape extending in the first direction DR1. In this case, each of the first display module 100a and the second display module 100b may have a flat shape. For example, each of the first display module 100a and the second display module 100b may have a display surface that is parallel with a plane defined by the first direction DR1 and a third direction DR3.

Figure 2:
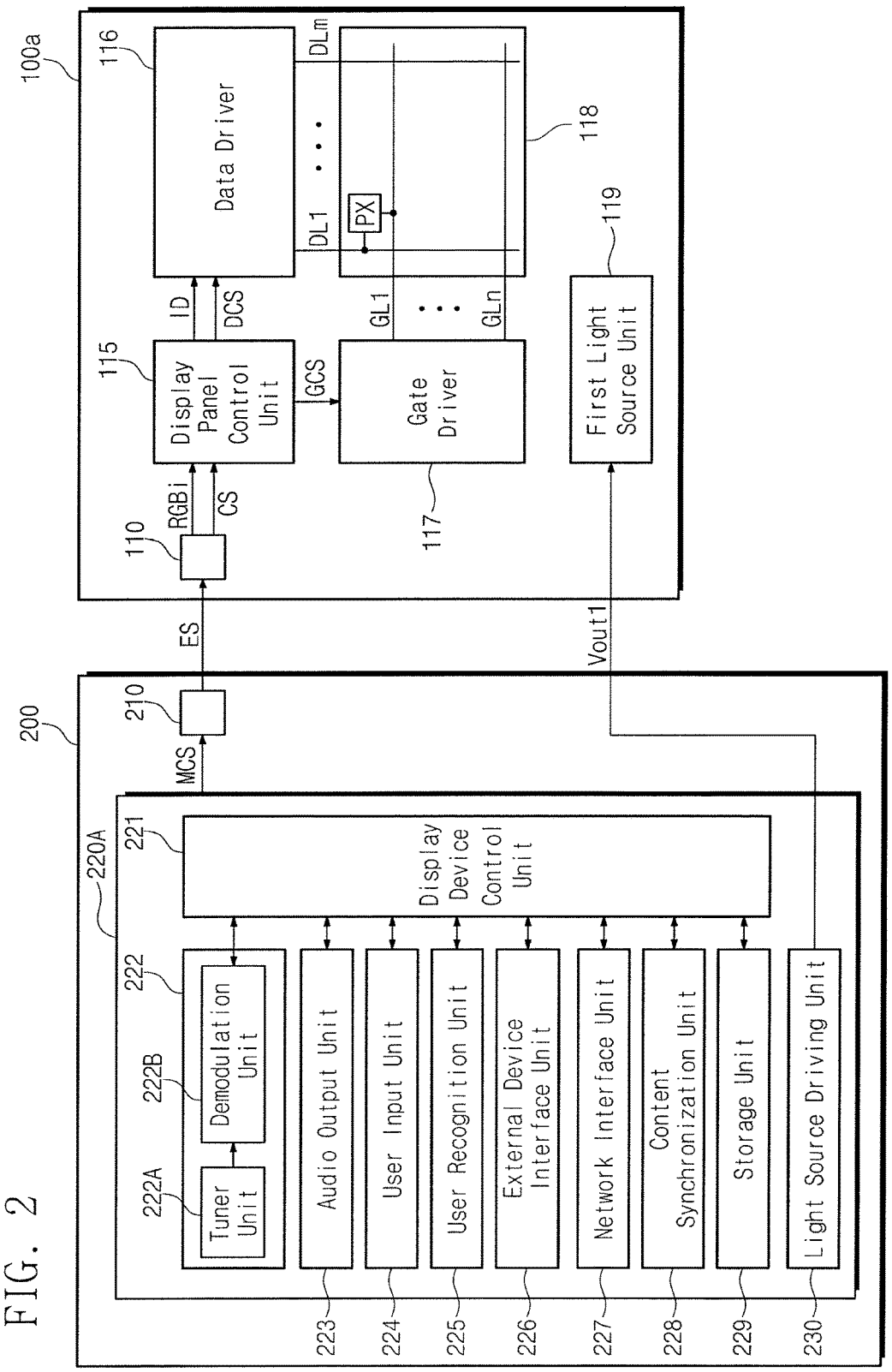
FIG. 2 illustrates a block diagram of the display device according to an embodiment.
Figure 3:
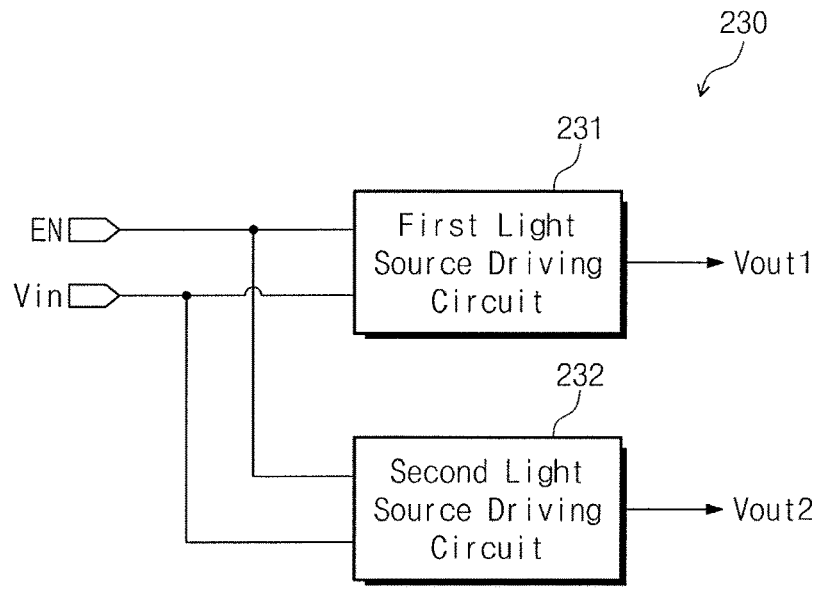
FIG. 3 illustrates a block diagram of a light source driving unit illustrated in FIG. 2.

FIG. 2 is a block diagram schematically illustrating a display device according to an embodiment. In particular, FIG. 2 is a block diagram schematically illustrating the display device 1000 in FIG. 1A in a state in which the first display module 100a is coupled with the cradle 200. FIG. 3 is a block diagram schematically illustrating the light source driving unit illustrated in FIG. 2.

Referring to FIGS. 2 and 3, the cradle 200 includes a signal transmission unit 210, and the electric module 220A. The signal transmission unit 210 receives a main control signal MCS from the electric module 220A and supplies an image signal ES to the first display module 100a.

The electric module 220A includes a display device control unit 221, a broadcast reception unit 222, an audio output unit 223, a user input unit 224, a user recognition unit 225, an external device interface unit 226, a network interface unit 227, a content synchronization unit 228, a storage unit 229, and a light source driving unit 230.

At least one among the broadcast reception unit 222, the audio output unit 223, the user input unit 224, the user recognition unit 225, the external device interface unit 226, the network interface unit 227, the content synchronization unit 228, and the storage unit 229 may be excluded from the electric module 220A.

The broadcast reception unit 222 may receive broadcast content or streaming content retransmitting the broadcast content. The broadcast content may be received from a broadcasting station and the streaming content may be received from a streaming server. The streaming servers may be various servers which provide live or recorded broadcast content, diverse video content, or the like through streaming.

The broadcast reception unit 222 may include a tuner unit 222A and a demodulation unit 222B. The tuner unit 222A selects a radio frequency (RF) broadcast signal corresponding to a user selected channel or every pre-stored channel among RF broadcast signals received through an antenna. Additionally, the selected RF broadcast signal is converted to an intermediate frequency (IF) signal or a baseband image or voice signal. For example, when the selected RF broadcast signal is a digital broadcast signal, the selected RF broadcast signal is converted to a digital IF signal, and when the selected RF broadcast signal is an analog broadcast signal, the selected RF broadcast signal is converted to an analog baseband image or voice signal.

The tuner unit 222A may process the digital broadcast signal or the analog broadcast signal. The tuner unit 222A may receive a single-carrier RF broadcast signal in accordance with the advanced television system committee (ATSC) standard, or a multi-carrier RF broadcast signal in accordance with the digital video broadcasting (DVB) standard.

The demodulation unit 222B may receive the digital IF signal converted in the tuner unit 222A and may perform a demodulation operation. The demodulation unit 222B may output a stream signal after performing the demodulation and channel decoding. The stream signal may be a multiplexed signal of an image signal, a voice signal, or a data signal. The stream signal output by the demodulation unit 222B may be input to the display device control unit 221.

The display device control unit 221 may perform de-multiplexing, image signal processing, voice signal processing, or the like, and then supplies the image signal ES to the first display module 100a.

The audio output unit 223 may output sound corresponding to an image displayed on the first display module 100a. The audio output unit 223 may output a sound by receiving a voice-processed signal from the display device control unit 221. The audio output unit 223 may be provided as a speaker.

The user input unit 224 transmits a user-input control command to the display device control unit 221, or transmits a signal provided from the display device control unit 221 to the user.

The user recognition unit 225 may include a camera. The user recognition unit 225 may capture an image of the user by using the camera, and recognize the user based on the captured image. Information of the captured image may be input to the display device control unit 221.

The external device interface unit 226 may transmit and receive data to and from a connected external device. To this end, the external device interface unit 226 may include a wireless communication unit, an A/V input and output unit, a USB port. a high definition multimedia interface (HDMI) port, an RGB port, or the like. The external device interface unit 226 may be connected in a wired or wireless way to the external devices such as a digital versatile disk (DVD), a Blu-ray, a game device, a camera, a camcorder, a computer, a laptop computer, a set-top box, and also perform input and output operations with the external device. The A/V input and output unit may receive image and voice signals of the external device. The wireless communication unit may perform wireless local area communication with other electronic devices.

The network interface unit 227 may provide an interface for connecting the display device 1000 according to an embodiment to a wired or wireless network including the Internet. For example, the network interface unit 227 may receive, through the network, content or data provided by an Internet provider, a content provider, or a network operator.

The content synchronization unit 228 may perform a control such that an image is displayed on the first display module 100a in synchronization with a synchronization reference time received from a content synchronization server. The synchronization reference time may be a time that is set up based on content identification information. The content synchronization unit 228 may have a memory for storing received image content.

The storage unit 229 may store a program for each signal processing and control performed in the display device control unit 221, and may also store signal processed image, voice, or data signal. The storage unit 229 may also temporarily store an image, voice, or data signal input to the external device interface unit 226. The storage unit 229 may store information about a predetermined broadcast channel via a channel memory function such as a channel map.

The light source driving unit 230 in FIG. 2 may output a driving voltage to a first light source unit 119 in the first display module 100a. The light source driving unit 230 may raise an input voltage Vin to a predetermined voltage and supply the input voltage Vin to the first light source unit 119.

Referring to FIG. 3, the light source driving unit 230 may include a first light source driving circuit 231 and a second light source driving circuit 232. Each of the first light source driving circuit 231 and the second light source driving circuit 232 may receive the input voltage Vin and an enable signal EN. The first light source driving circuit 231 may raise the input voltage Vin and output a first driving voltage Vout1, and the second light source driving circuit 232 may raise the input voltage Vin and output a second driving voltage Vout2.

In FIG. 3, the first light source driving circuit 231 and the second light source driving circuit 232 are exemplarily illustrated as receiving the same input voltage Vin. However, embodiments are not limited thereto. For example, in other embodiments, each of the first light source driving circuit 231 and the second light source driving circuit 232 may receive different input voltages from each other.

When the first display module 100a is coupled to the cradle 200, the light source driver 230 operates in a first mode in which the first light source driving circuit 231 may output the first driving voltage Vout1 to the first light source unit 119 of the first display module 100a. When the second display module 100b of FIG. 1C is coupled to the cradle 200, the light source driver 230 operates in a second mode in which the first light source driving circuit 231 may output the first driving voltage Vout1 to the second light source unit of the second display module 100b of FIG. 1C.

When the first display module 100a is coupled to the cradle 200, an output terminal of the second light source driving circuit 232 may be opened. In other words, the second light source driving circuit 232 and the first light source unit 119 are electrically disconnected. Thus, the first light source unit 119 does not receive the second driving voltage Vout2. When the second display module 100b of FIG. 1C is coupled to the cradle 200, the second light source driving circuit 232 may output the second driving voltage Vout2 to a third light source unit of the second display module 100b of FIG. 1C. This will be described in detail with reference to FIGS. 5 and 7.

According to an embodiment, in addition to the first light source driving circuit 231 for supplying a primary driving voltage to the light source unit of the display module, the cradle 200 may include the second light source driving circuit 232 for supplying an additional driving voltage. Specifically, according to the size of the display module coupled to the cradle 200, the second light source driving circuit 232 may operate in either a first operation mode in which the second light source driving circuit 232 is electrically connected to the light source unit of the display module to thereby output the second driving voltage Vout2 to the light source unit, or a second operation mode in which the second light source driving circuit 232 is electrically disconnected from the light source unit, and, thus, does not output the second driving voltage Vout2 to the light source unit. Accordingly, even when the display modules having various sizes are coupled to the cradle 200, the cradle 200 may supply the driving voltage required by the light source unit in the display module.

FIG. 2 schematically illustrates a block diagram of the first display module 100a. The second display module 100b may include similar components to those of the first display module 100a. Therefore, descriptions of the second display module 100b are omitted.

As illustrated in FIG. 2, the first display module 100a may include a signal reception unit 110, a display panel control unit 115, a data driver 116, a gate driver 117, a display panel 118, and the first light source unit 119.

The signal reception unit 110 receives the image signal ES from the signal transmission unit 210. The signal reception unit 110 may output an input image signal RGBi and a plurality of control signals CS to the display panel control unit 115.

The display panel control unit 115 controls driving of the data driver 116 and the gate driver 117. The display panel control unit 115 may convert the data format of the input image signal RGBi to match an interface specification of the data driver 116 and the structure of the display panel 118, to thereby generate an output image data ID and provides the output image data ID to the data driver 116.

The display panel control unit 115 may generate, based on the plurality of control signals CS, a gate control signal GCS (e.g., a vertical start signal, a vertical clock signal, and a vertical clock bar signal), and a data control signal DCS (e.g., an output start signal, a horizontal start signal, or the like). The gate control signal GCS is supplied to the gate driver 117 and the data control signal DCS is supplied to the data driver 116.

The data driver 116 may convert the output image data ID into data voltages and output the data voltages in response to the data control signal DCS supplied from the display panel control unit 115. The output data voltages are applied to the display panel 118.

The gate driver 117 may sequentially output gate signals in response to the gate control signal GCS supplied from the display panel control unit 115.

The display panel 118 displays an image. The display panel 118 may include a plurality of gate lines GL1 to GLn, a plurality of data lines DL1 to DLm, and a plurality of pixels PX. In FIG. 2, only the first and n-th gate lines GL1 and GLn among the plurality of gate lines GL1 to GLn are illustrated by way of example, and illustration of the remaining gate lines is omitted. Additionally, in FIG. 2, the first and m-th data lines DL1 and DLm among the plurality of data lines DL1 to DLm are illustrated by way of example, and illustration of the remaining data lines is omitted.

The plurality of gate lines GL1 to GLn are connected to the gate driver 117, and receive the gate signals from the gate driver 117. The plurality of data lines DL1 to DLm are connected to the data driver 116, and receive the data voltages from the data driver 116.

The pixels PX may be arranged in a matrix. The pixels PX may display at least one of primary colors such as red, green, and blue. The colors which the pixels PX may display are not limited to red, green, and blue, e.g., the pixels PX may display various colors such as secondary primary colors including yellow, cyan, and magenta, in addition to red, green, and blue.

The pixels PX may be defined as an element for displaying a unit image, and the resolution of the display panel 118 may be determined according to the number of the pixels PX provided to the display panel 118. In FIG. 2, a single pixel PX is illustrated, and illustration of the remaining pixels is omitted.

The pixels PX may be driven by being connected to a corresponding gate line among the plurality of gate lines GL1 to GLn and a corresponding data line among the plurality of data lines DL1 to DLm.

The first light source unit 119 may provide light to the display panel 118. The first light source unit 119 may be a direct lighting type in which the first light source unit 119 is disposed below the display panel 118 and provides light to the display panel 118. or an edge lighting type in which the first light source unit 119 is disposed on one side of a light guide plate disposed below the display panel 118, and provides light to the light guide plate.

The first light source unit 119 may receive the first driving voltage Vout1 from the light source driving unit 230. The first light source unit 119 and the light source driving unit 230 may be electrically connected through a first connector CNT1 of FIG. 1B and a second connector CNT2 of FIG. 1B.

The signal transmission unit 210 and the signal reception unit 110 may also be electrically connected through the first connector CNT1 of FIG. 1B and the second connector CNT2 of FIG. 1B. In this case, as the first display module 100a and the cradle 200 are coupled, the image signal ES and the first driving voltage Vout1 may be transmitted from the cradle 200 to the first display module 100a through the first connector CNT1 of FIG. 1B and the second connector CNT2 of FIG. 1B.

However, embodiments are not limited thereto. For example, the signal transmission unit 210 and the signal reception unit 110 may transmit and receive a signal while disconnected from, and, thus, independent of the first connector CNT1 of FIG. 1B and the second connector CNT2 of FIG. 1B. The signal transmission unit 210 and the signal reception unit 110 may also be electrically connected through other terminals, or communicate with each other wirelessly. In this case, the signal transmission unit 210 and the signal reception unit 110 may be communication modules capable of performing one-way or bidirectional wireless communication. Here, the signal transmission unit 210 may provide the image signal ES wirelessly to the signal reception unit 110.

Figure 4:
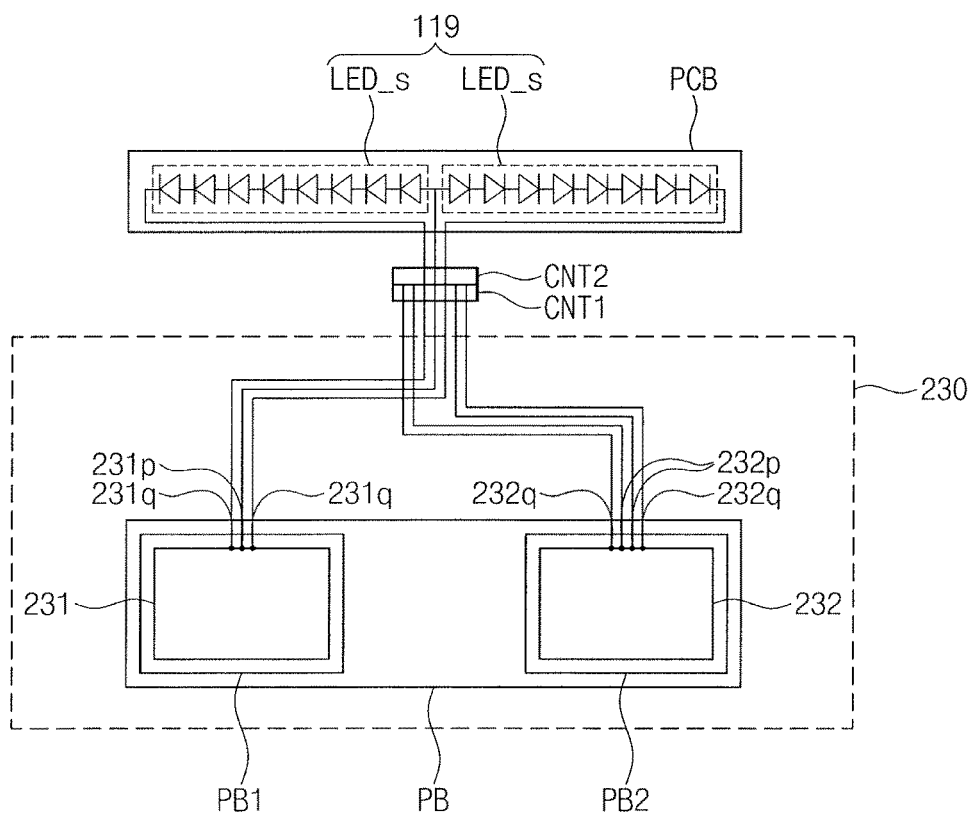
FIG. 4 schematically illustrates a portion of a configuration of a cradle and a first display module coupled to the cradle.
Figure 5:
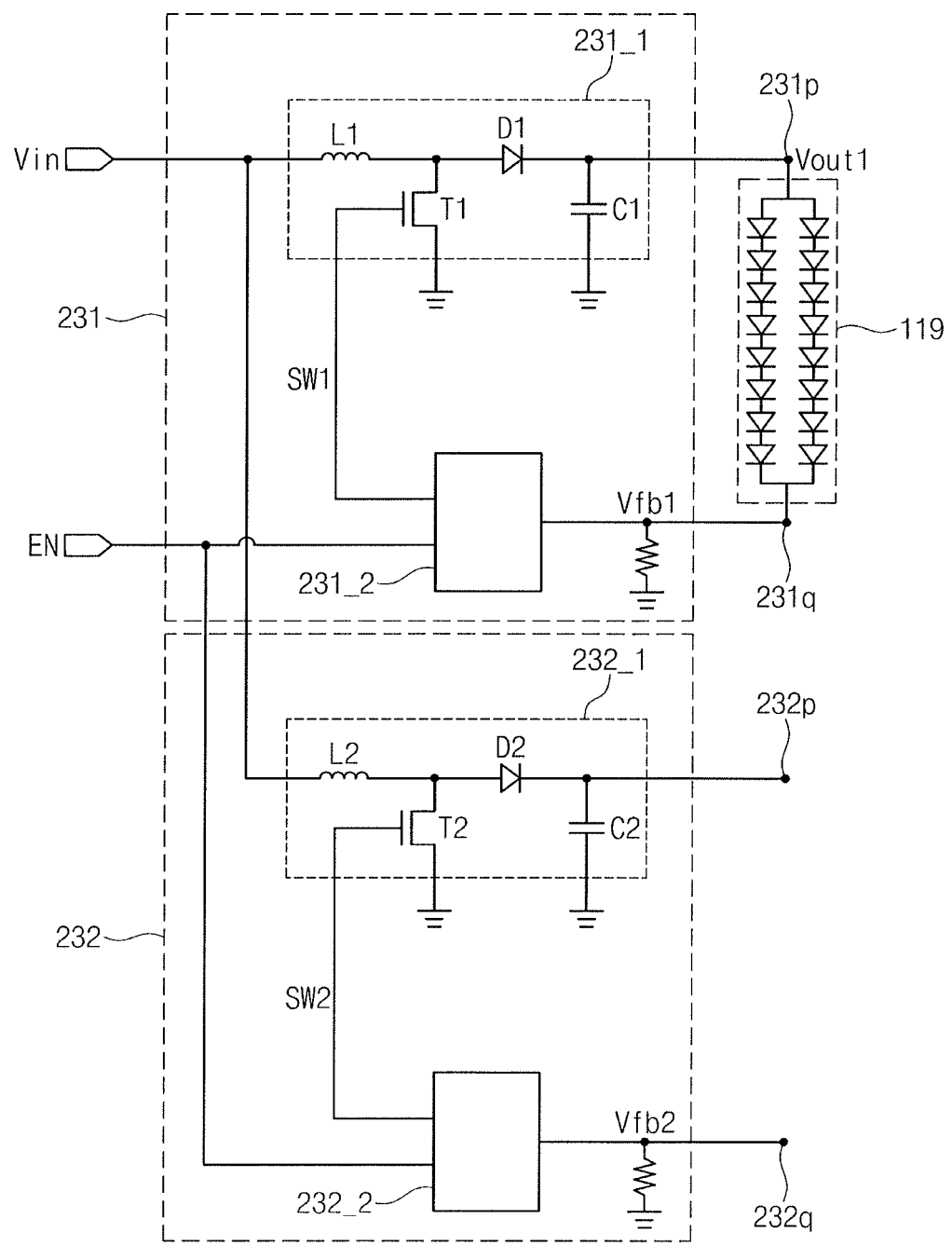
FIG. 5 illustrates a circuit diagram of a first light source unit and the light source driving unit.

FIG. 4 schematically illustrates a portion of a configuration of the cradle and the first display module 100a coupled to the cradle. FIG. 5 is a circuit diagram illustrating a first light source unit 119 of the first display module 100a and the light source driving unit 230.

Referring to FIGS. 4 and 5, the first light source unit 119 may include two light source strings LED_S. The two light source strings LED_S may be connected in parallel with each other. In FIG. 4. the first light source unit 119 is illustrated to include two light source strings LED_S, but is not limited thereto. For example, the first light source unit 119 may include only one light source string LED_S, or three or more light source strings LED_S.

The light source string LED_S may be include a plurality of light sources LED. The plurality of light sources LED may be connected in series to compose one light source string LED_S. In FIG. 4, one light source string LED_S is exemplarily illustrated to include eight light sources LED, but is not limited thereto. The number of the light sources LED included in one light source string LED_S may increase or decrease depending on the size of the first display module 100a of FIG. 1A.

The first light source unit 119 may be mounted on a printed circuit board PCB. A preset wiring may be formed on the printed circuit board PCB, and the light sources LED may be electrically interconnected by the wiring formed on the printed circuit board PCB. In FIG. 4, the light sources LED are exemplarily illustrated as being mounted on a single printed circuit board PCB, but embodiments are not limited thereto. A plurality of two or more of the printed circuit board PCB may be provided, and the first light source unit 119 may be on each of the plurality of printed circuit boards PCB.

The light source driving unit 230 may include the first light source driving circuit 231 and the second light source driving circuit 232. Each of the first light source driving circuit 231 and the second light source driving circuit 232 may receive the same input voltage Vin and enable signal EN. The first light source driving circuit 231 may include a power converter 231_1, a control circuit unit 231_2, a first output terminal 231p, and a second output terminal 231q. The second light source driving circuit 232 may include a power converter 232_1, a control circuit unit 232_2, a first output terminal 232p, and a second output terminal 232q.

The control circuit units 231_2 and 232_2 may include a plurality of electronic elements. The control circuit units 231_2 and 232_2 may receive feedback voltages Vfb1 and Vfb2, and output switching signals SW1 and SW2 for controlling the power converters 231_1 and 232_1. The power converters 231_1 and 232_1 may include coils L1 and L2, diodes D1 and D2, capacitors C1 and C2, and switching devices T1 and T2.

The switching devices T1 and T2 are turned on or off in response to the switching signals SW1 and SW2, and the coils L1 and may increase the input voltage Vin according to an on or off operation of the switching devices T1 and T2. The diodes D1 and D2 may perform a control such that a current is output one-way directionally. The capacitors C1 and C2 may stabilize the increased voltage.

The levels of the driving voltages Vout1 and Vout2 may be adjusted according to the turning on and off of the switching devices T1 and T2 in accordance with the switching signals SW1 and SW2 input to control terminals of the switching devices T1 and T2. The levels of the first driving voltage Vout1 and the second driving voltage Vout2 may be different from each other or the same.

The light source driving unit 230 may be electrically connected to the first connector CNT1. According to an embodiment, the first connector CNT1 may be electrically connected to the first output terminal 231p of the first light source driving circuit 231, the second output terminal 231q of the first light source driving circuit 231, the first output terminal 232p of the second light source driving circuit 232, and the second output terminal 232q of the second light source driving circuit 232.

The first light source unit 119 of the first display module 100a may be electrically connected to the second connector CNT2. When the first connector CNT1 and the second connector CNT2 are electrically connected, the first light source unit 119 may be electrically connected to the first output terminal 231p of the first light source driving circuit 231 and the second output terminal 231q of the first light source driving circuit 231. Accordingly, the power converter 231_1 may raise the input voltage Vin to the first driving voltage Vout1 and output the voltage to the first light source unit 119.

When the first connector CNT1 and the second connector CNT2 are electrically connected, the first output terminal 232p of the second light source driving circuit 232 and the second output terminal 232q of the second light source driving circuit 232 in the first connector CNT1 may be opened. In other words, the first output terminal 232p and the second output terminal 232q of the second light source driving circuit 232, and the first light source unit 119 may be electrically disconnected.

In FIG. 4, a printed circuit board PB, a first printed circuit board PB1, and a second printed circuit board PB2 are illustrated. This is for the convenience of description, and the first light source driving circuit 231 and the second light source driving circuit 232 may be on the single printed circuit board PB, or the first light source driving circuit 231 may be on the first printed circuit board PB1 and the second light source driving circuit 232 may be on the second printed circuit board PB2.

In other words, the first light source driving circuit 231 and the second light source driving circuit 232 may be disposed on the single printed circuit board, and thus, not be physically separate, or the first light source driving circuit 231 and the second light source driving circuit 232 may be respectively disposed on the first printed circuit board PB1 and the second printed circuit board PB2, and thus, physically separate.

The second printed circuit board PB2 on which the second light source driving circuit 232 is mounted may be detachably coupled to the cradle 200 of FIG. 1A. For example, a slot may be provided inside the cradle 200 of FIG. 1A, and the second printed circuit board PB2 on which the second light source driving circuit 232 is mounted may be coupled to or uncoupled from the slot. This is only an example, and the second printed circuit board PB2 may be coupled to the electric module inside the cradle 200 of FIG. 1A in various forms other than being slot-inserted.

According to the size of the display module coupled to the cradle 200, the second printed circuit board PB2 on which the second light source driving circuit 232 is mounted may be separated from the cradle 200 to be replaced with other light source driving circuit. Additionally, in other embodiments, a plurality of slots may be provided in addition to the slot to which the second printed circuit board PB2 is coupled, to allow a light source driving circuit to be added according to the size of the display module coupled to the cradle 200.

Figure 6:
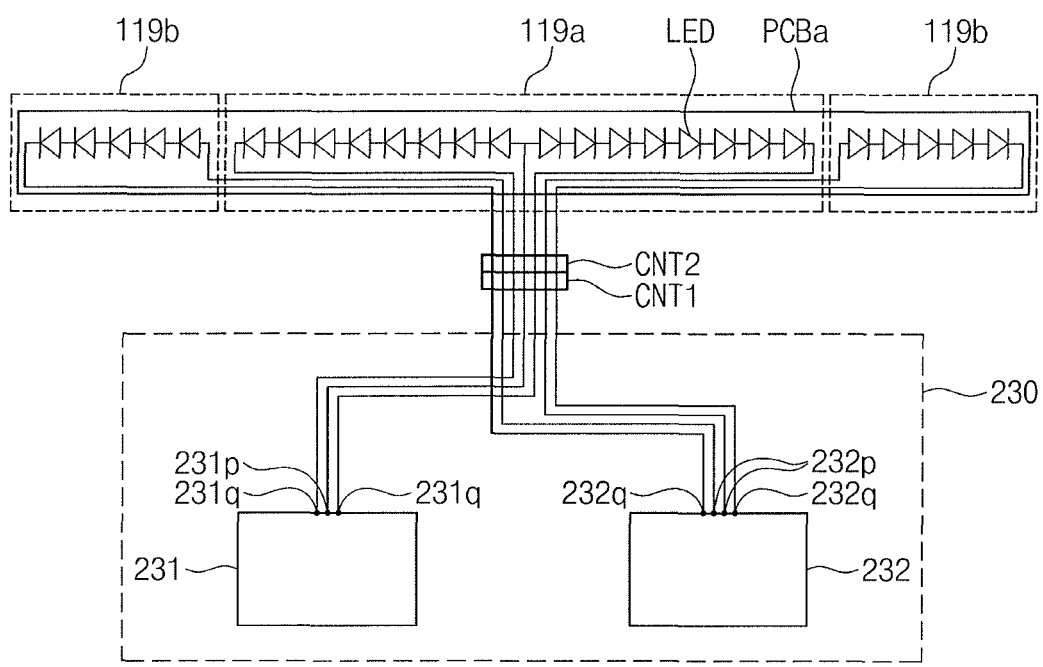
FIG. 6 schematically illustrates a portion of a configuration of the cradle and a second display module coupled to the cradle.
Figure 7:
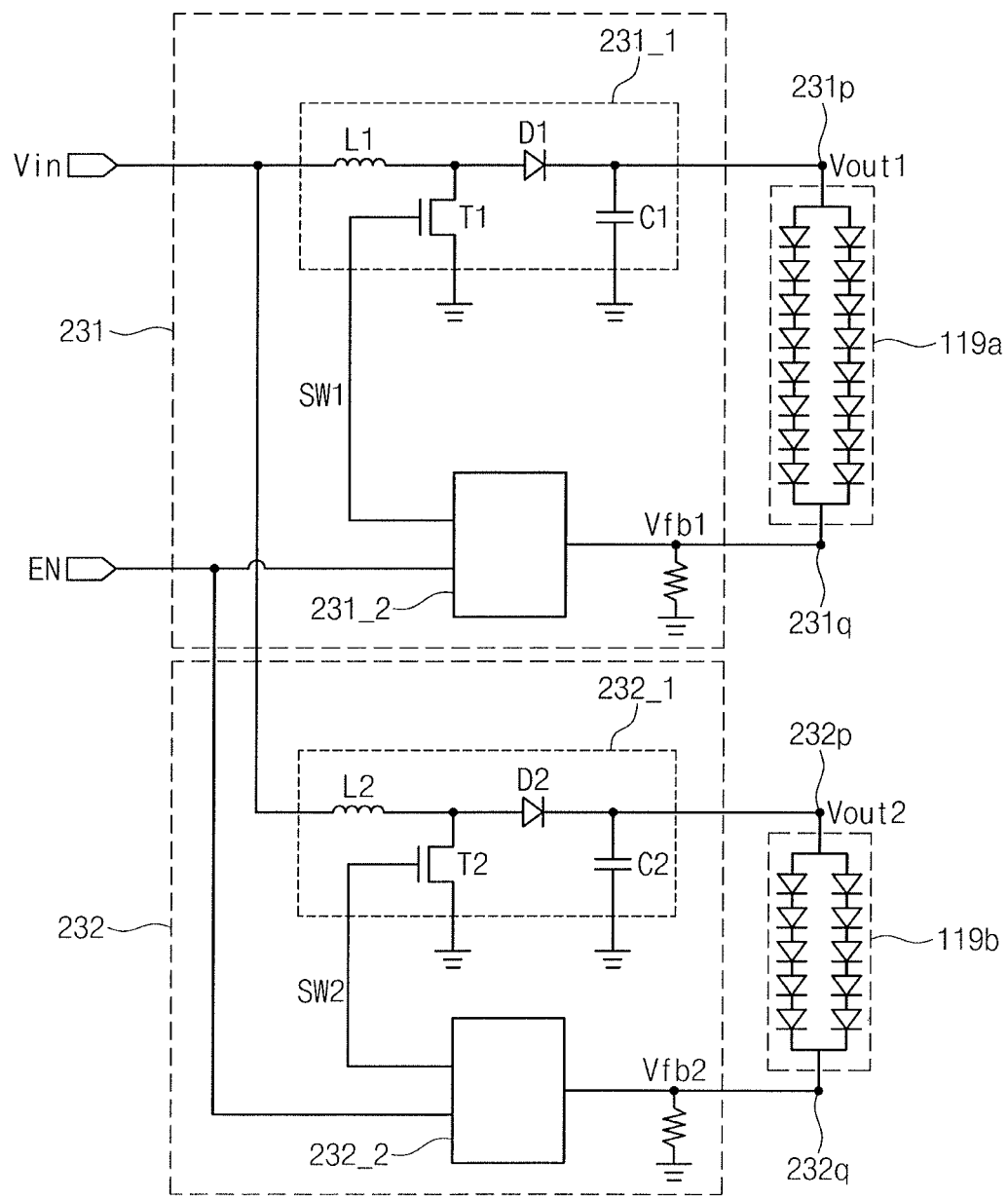
FIG. 7 illustrates a circuit diagram of a second light source unit, a third light source unit, and the light source driving unit.

FIG. 6 schematically illustrates a portion of a configuration of the cradle 200 and the second display module 100b coupled to the cradle. FIG. 7 is a circuit diagram illustrating a second light source unit 119a, a third light source unit 119b, and the light source driving unit 230.

Referring to FIGS. 6 and 7, the second display module 100b of FIG. 1C is bigger than the first display module 100a of FIG. 1A. Accordingly, the second display module 100b of FIG. 1C may have more light sources than the first display module 100a of FIG. 1A.

The second display module 100b of FIG. 1C may include a second light source unit 119a and a third light source unit 119b. The second light source unit 119a may be electrically connected to the first light source driving circuit 231 and the third light source unit 119b may be electrically connected to the second light source driving circuit 232.

The second light source unit 119a may include the same number of light sources as the first light source unit 119 of FIG. 4. Accordingly, the first driving voltage Vout1, which is the same as the voltage supplied to the first light source unit 119 of FIG. 4, may be supplied to the second light source unit 119a.

The third light source unit 119b may include two light source strings, e.g., five light sources connected in series.

The number of light sources composing the light source string and the number of the light source strings may change variously according to the size of the second display module 100*b* of FIG. 1C.

According to an embodiment, as the size of the display module coupled to the cradle 200 of FIG. 1C changes, a light source driving circuit for supplying an additional driving voltage to the light source is disposed inside the cradle 200 of FIG. 1C. In the embodiment, the circuit for supplying the additional driving voltage may be the second light source driving circuit 232. Although a single circuit for supplying the additional driving voltage is described by way of example, embodiments are not limited thereto. For example, in order to extend the range of the display modules coupled to the cradle, a plurality of the light source driving circuit for supplying additional driving voltage may be provided.

When compared to the first display module 100*a* of FIG. 1B, the second display module 100*b* of FIG. 1C may further include the third light source unit 119*b*. The third light source unit 119*b* may be electrically connected to the second light source driving circuit 232. The third light source unit 119*b* may be electrically connected to the first output terminal 232*p* and the second output terminal 232*q* of the second light source driving circuit 232.

When the first connector CNT1 and the second connector CNT2 are electrically connected, the first light source driving circuit 231 may output the first driving voltage Vout1 to the second light source unit 119*a*, and the second light source driving circuit 232 may output the second driving voltage Vout2 to the third light source unit 119*b*.

Figure 8:
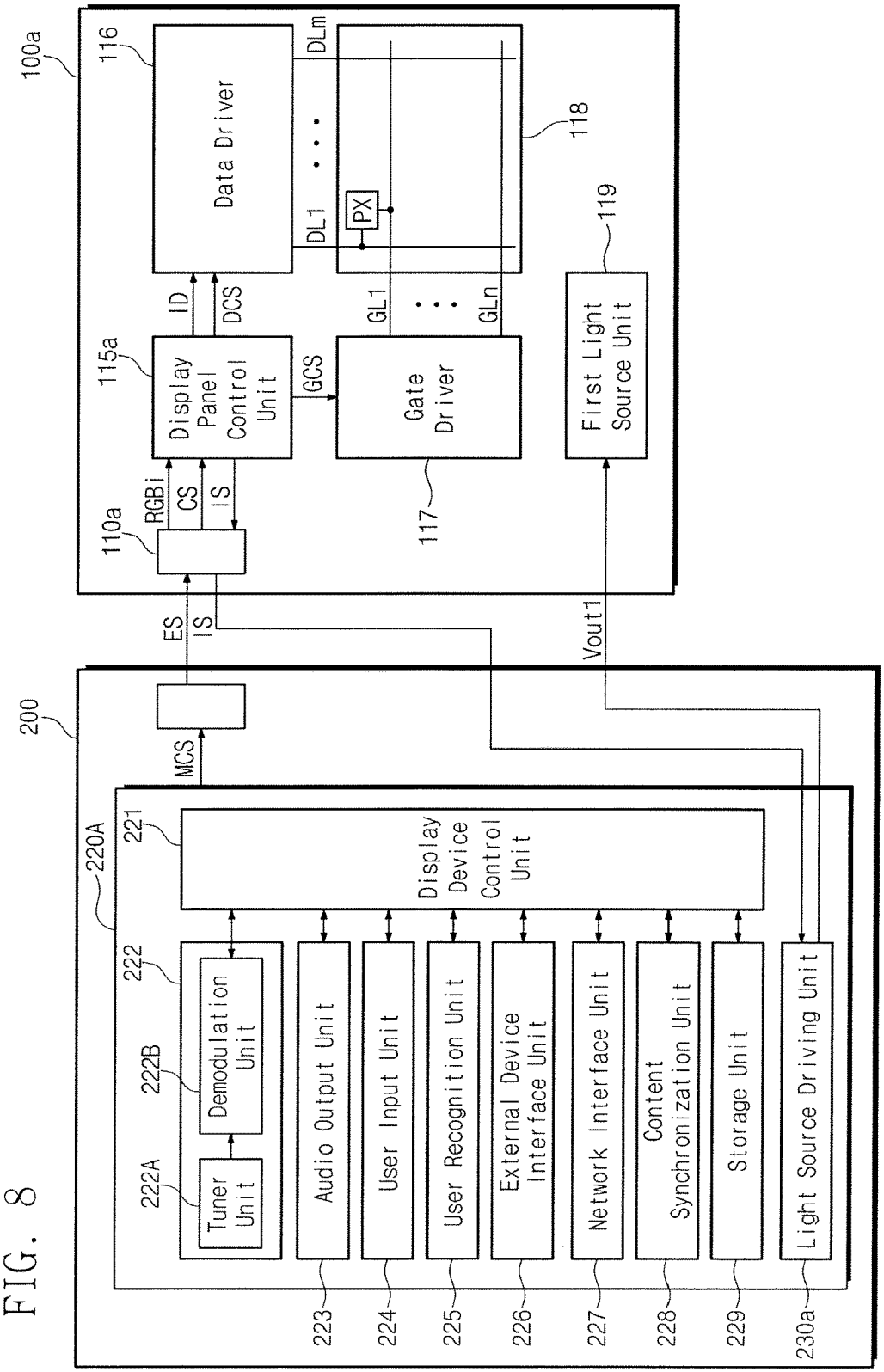
FIG. 8 illustrates a block diagram of a display device according to an embodiment.
Figure 9:
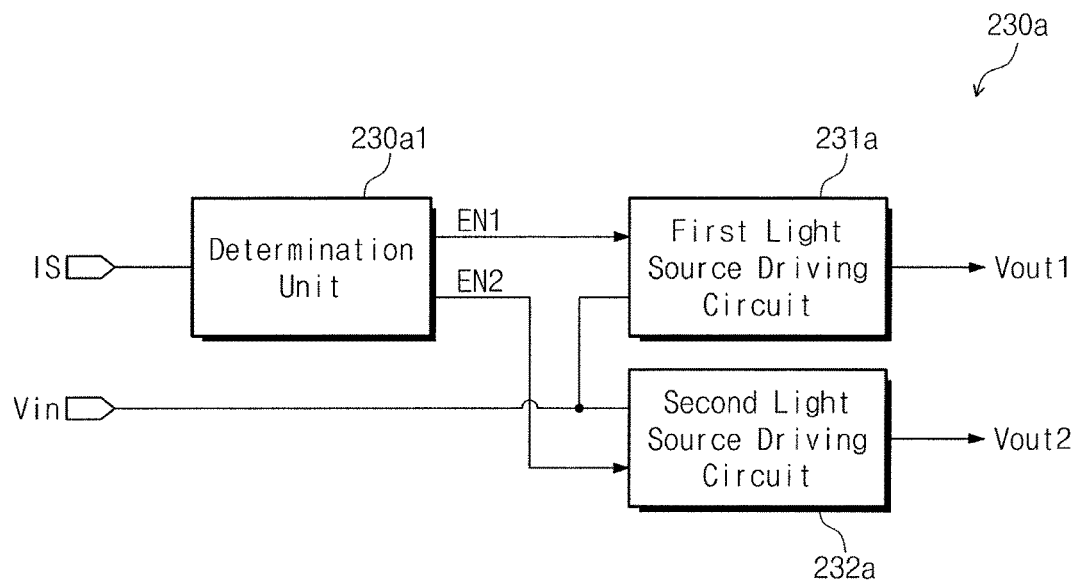
FIG. 9 illustrates a block diagram of a light source driving unit illustrated in FIG. 8.

FIG. 8 is a block diagram schematically illustrating a display device according to an embodiment. FIG. 9 is a block diagram schematically illustrating a light source driving unit 230*a* illustrated in FIG. 8. When describing FIG. 8, components identical to those described with respect to FIG. 2 are given respectively the same reference numerals, and duplicate descriptions are omitted.

Referring to FIGS. 8 and 9, a display panel control unit 115*a* may output a size information signal IS. A signal reception unit 110*a* may be a bidirectional communication module. Accordingly, the signal reception unit 110*a* may output the size information signal IS to the cradle 200, e.g., to the light source driving unit 230*a*.

The light source driving unit 230*a* may include a determination unit 230*a*1, a first light source driving circuit 231*a*, and a second light source driving circuit 232*a*. The determination unit 230*a*1 may receive the size information signal IS to determine whether the first light source driving circuit 231*a* and the second light source driving circuit 232*a* are to operate or not. The determination unit 230*a*1 may be a circuit having a plurality of electronic elements.

For example, when the size information signal IS indicates that the display module has the first size, the determination unit 230*a*1 may output a first enable signal EN1 to the first light source driving circuit 231*a*. When the size information signal IS indicates that the display module has the second size, the determination unit 230*a*1 may output the first enable signal EN1 to the first light source driving circuit 231*a* and output a second enable signal EN2 to the second light source driving circuit 232*a*.

The first light source driving circuit 231*a* may receive the first enable signal EN1, and output the first driving voltage Vout1 to the light source unit connected to an output terminal, and the second light source driving circuit 232*a* may receive the second enable signal EN2, and output the second driving voltage Vout2 to the light source unit connected to an output terminal.

Figure 10:
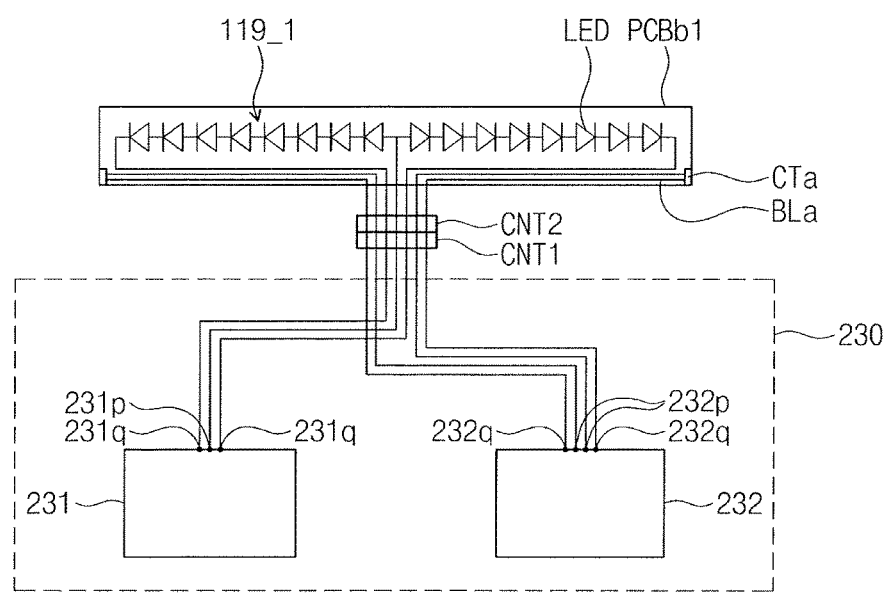
FIG. 10 illustrates a schematic portion of a configuration of the cradle and a first display module coupled to the cradle.
Figure 11:
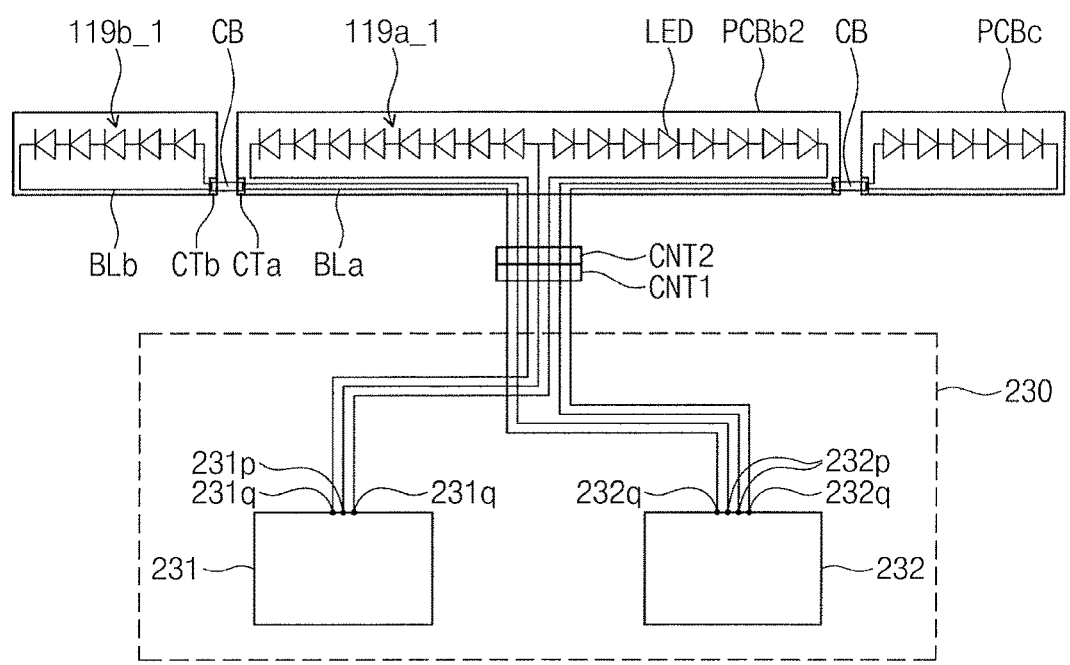
FIG. 11 illustrates a schematic portion of a configuration of the cradle and a second display module coupled to the cradle.

FIG. 10 schematically illustrates a portion of a configuration of the cradle and a first display module 100*a* coupled to the cradle 200. FIG. 11 schematically illustrates a portion of a configuration of the cradle 200 and a second display module 100*b* coupled to the cradle. When describing FIGS. 10 and 11, components identical to those described with respect to FIG. 4 are given respectively the same reference numerals, and duplicate descriptions are omitted.

Referring to FIGS. 10 and 11, a first printed circuit board PCBb1 on which a first light source unit 119_1 is mounted and a second printed circuit board PCBb2 on which a second light source unit 119*a*_1 is mounted may have the same configuration.

On the first printed circuit board PCBb1 and the second printed circuit board PCBb2, other wiring BLa may be further disposed in addition to wiring for electrically connecting the first light source unit 119_1 and the second light source unit 119*a*_1 respectively. The wiring BLa may electrically connect, to the second connector CNT2, a connector CTa disposed on each of the first printed circuit board PCBb1 and the second printed circuit board PCBb2.

Referring to FIG. 10, as the first connector CNT1 and the second connector CNT2 are connected, the second light source driving circuit 232 may be electrically connected to the wiring BLa. One end of the wiring BLa is connected to the second connector CNT2, and the other end of the wiring BLa is connected to the connector CTa. The connector CTa in FIG. 10 may be opened. Therefore, a circuit diagram for the configuration in FIG. 10 may be substantially identical to that of FIG. 5 described above.

Referring to FIG. 11, the second display module may further include a third light source unit 119*b*_1 in addition to the second light source unit 119*a*_1. The third light source unit 119*b*_1 may be mounted on a third printed circuit board PCBc. The second printed circuit board PCBb2 and the third printed circuit board PCBc may be separated from each other. Wiring BLb and a connector CTb which electrically connect light sources of the third light source unit 119*b*_1 may be on the third printed circuit board PCBc.

The connector CTa of the second printed circuit board PCBb2 and the connector CTb of the third printed circuit board PCBc may be connected through a cable CB. This is, however, an illustrative example, and embodiments are not limited thereto. For example, the connector CTa of the second printed circuit board PCBb2 and the connector CTb of the third printed circuit board PCBc may have an interlocking structure, or may be electrically connected by being directly coupled to each other. In addition, only a terminal may be disposed in each of the first printed circuit board PCBb1, the second printed circuit board PCBb2, and the third printed circuit board PCBc, and the terminals may be electrically interconnected via a flexible circuit film, or the like.

The connector CTa on the second printed circuit board PCBb2 and the connector CTb on the third printed circuit board PCBc may be electrically connected such that the wiring BLa of the second printed circuit board PCBb2 and the wiring BLb of the third printed circuit board PCBc are electrically connected. Accordingly, the second light source driving circuit 232 may be electrically connected to the third light source unit 119*b*_1. A circuit diagram for the configuration in FIG. 11 may be substantially identical to that of FIG. 7 described above.

Figure 12:
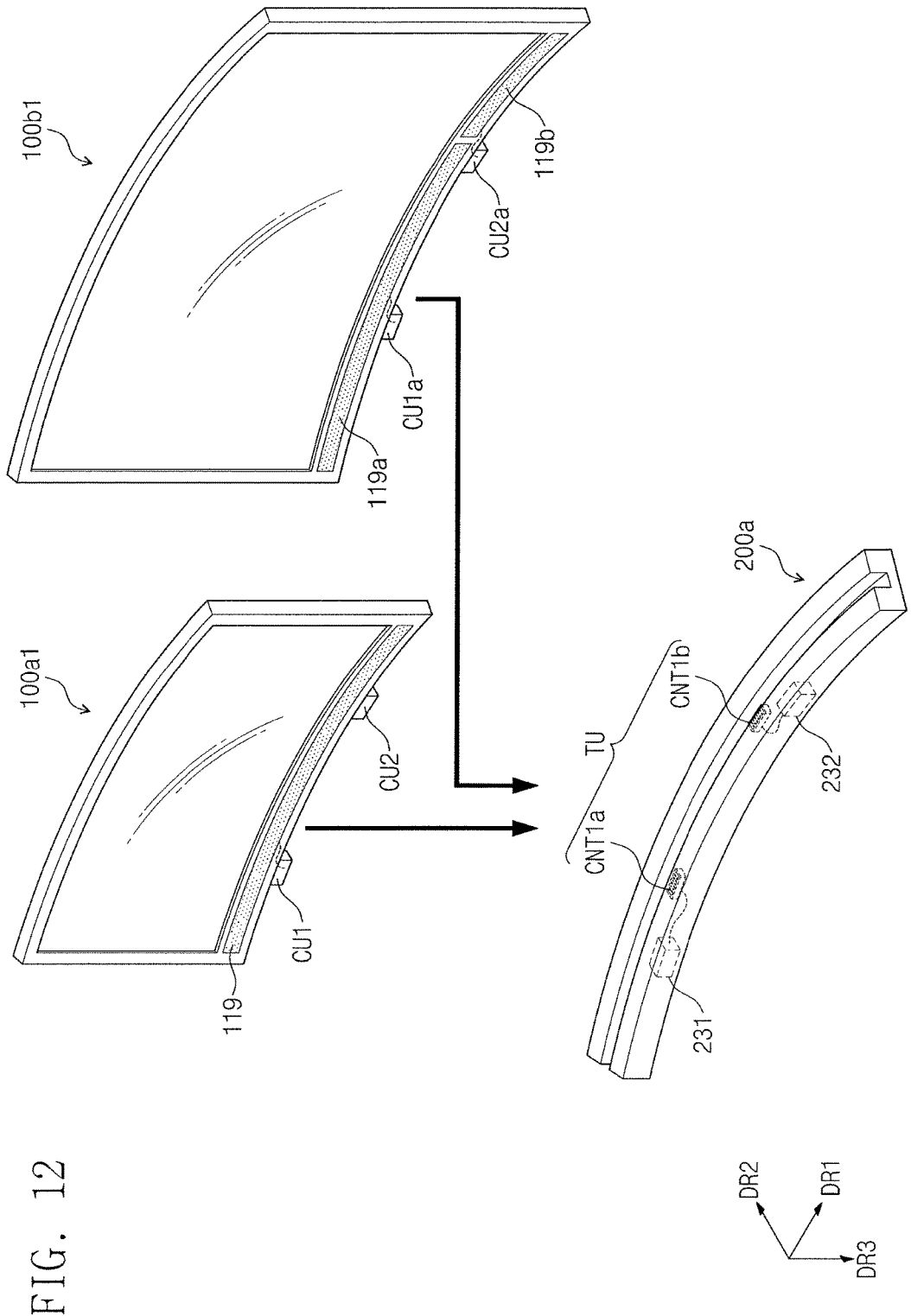
FIG. 12 illustrates a schematic exploded perspective view of a display device according to an embodiment.

FIG. 12 is an exploded perspective view schematically illustrating a display device according to an embodiment. When describing FIG. 12, components identical to those described with respect to FIG. 1B are given respectively the same reference numerals, and duplicate descriptions are omitted.

Referring to FIG. 12, a connector unit TU of a cradle 200a may include a first connector CNT1a and a second connector CNT1b. In this embodiment, the connector unit TU is illustrated, by way of example, to include two connectors, but is not limited thereto, i.e., there may be more than two connectors.

The first light source driving circuit 231 may be electrically connected to the first connector CNT1a, and the second light source driving circuit 232 may be electrically connected to the second connector CNT1b. That is, the first light source driving circuit 231 and the second light source driving circuit 232 may be electrically connected to different connectors from each other.

A first display module 100a1 and a second display module 100b1 coupled to the cradle 200a may include respectively first coupling units CU1 and CU1a coupled to the first connector CNT1a and also respectively second coupling units CU2 and CU2a coupled to the second connector CNT1b.

The first display module 100a1 may include the first light source unit 119, and the first light source unit 119 may be electrically connected to the first coupling unit CU1.

When the first display module 100a1 is coupled to the cradle 200a, the first light source unit 119 may receive a driving voltage from the first light source driving circuit 231 through the first connector CNT1a and the first coupling unit CU1. In this case, the second coupling unit CU2 may function as a coupling unit for fixing the cradle 200a and the first display module 100a1.

The second display module 100b1 may include the second light source unit 119a and the third light source unit 119b, the second light source unit 119a may be electrically connected to the first coupling unit CU1a, and the third light source unit 119b may be electrically connected to the second coupling unit CU2a. That is, when the second display module 100b1 is coupled to the cradle 200a, the second light source unit 119a may receive a driving voltage from the first light source driving circuit 231 through the first connector CNT1a and the first coupling unit CU1a, and the third light source unit 119b may receive a driving voltage from the second light source driving circuit 232 through the second connector CNT1b and the second coupling unit CU2a.

Figure 13:
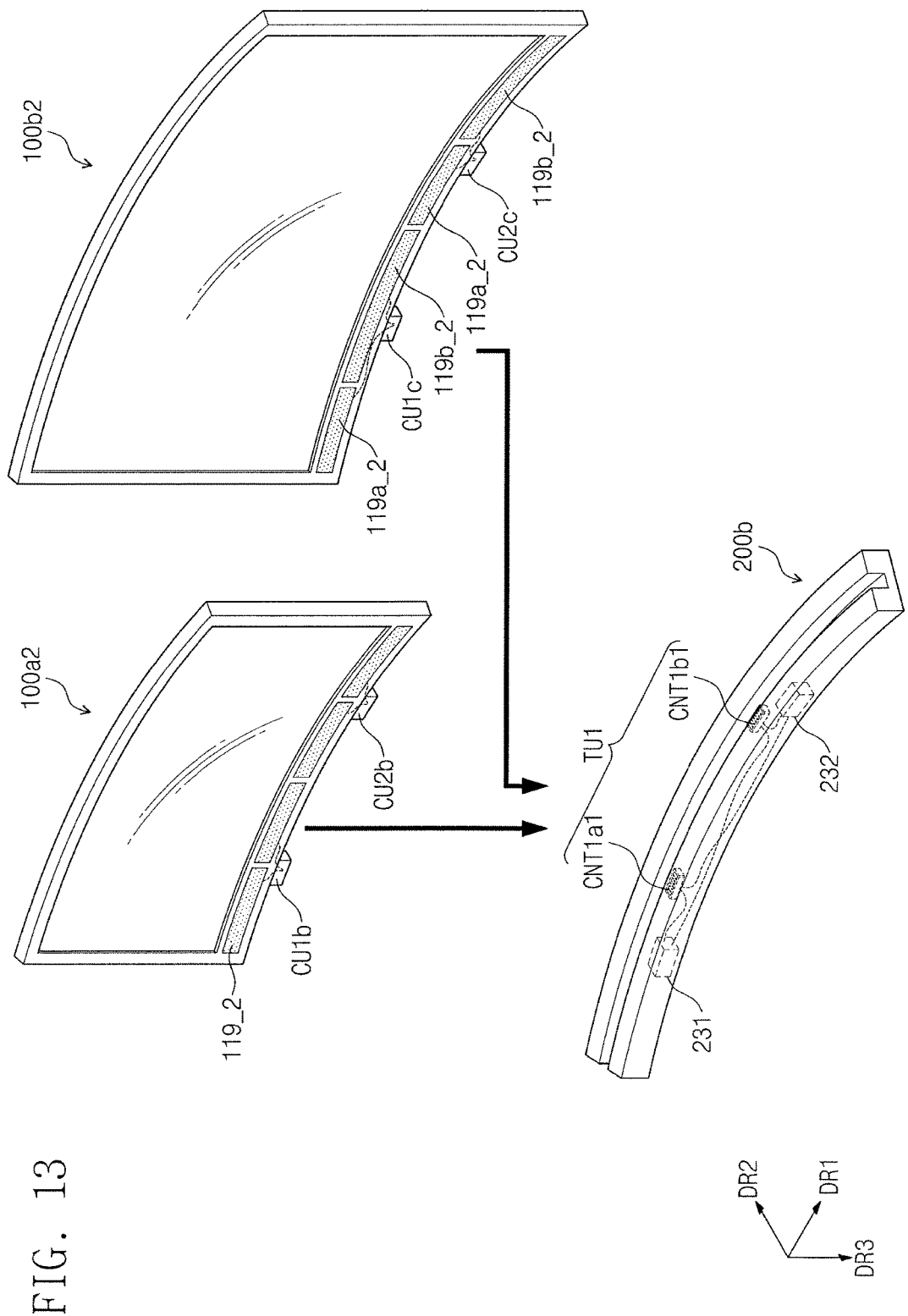
FIG. 13 illustrates a schematic exploded perspective view of a display device according to an embodiment.

FIG. 13 is an exploded perspective view schematically illustrating a display device according to an embodiment. Referring to FIG. 13, a connector unit TU1 of a cradle 200b may include a first connector CNT1a1 and a second connector CNT1b1. The first light source driving circuit 231 may be electrically connected to the first connector CNT1a1 and the second connector CNT1b1, and the second light source driving circuit 232 may be electrically connected to the first connector CNT1a1 and the second connector CNT1b1.

A first display module 100a2 and a second display module 100b2 coupled to the cradle 200b may include respectively first coupling units CU1b and CU1c coupled to the first connector CNT1a1 and also respectively second coupling units CU2b and CU2c coupled to the second connector CNT1b1.

The first display module 100a2 may include a plurality of first light source units 119_2. A portion of the plurality of first light source units 119_2 may be electrically connected to the first coupling unit CU1b, and the rest of the plurality of first light source units 119_2 may be electrically connected to the second coupling unit CU2b. That is, when the first display module 100a2 is coupled to the cradle 200b, two of the first light source units may receive a driving voltage from the first light source driving circuit 231 through the first connector CNT1a1 and the first coupling unit CU1b, and two of the first light source units may receive a driving voltage from the first light source driving circuit 231 through the second connector CNT1b1 and the second coupling unit CU2b. In this case, all of the driving voltages received by the first light source units 119_2 may be voltages generated in the first light source driving circuit 231.

The second display module 100b2 may include a plurality of second light source units 119a_2 and a plurality of third light source units 119b_2. A portion of the plurality of second light source units 119a_2 may be electrically connected to the first coupling unit CU1c, and the rest of the plurality of second light source units 119a_2 may be electrically connected to the second coupling unit CU2c. A portion of the plurality of third light source units 119b_2 may be electrically connected to the first coupling unit CU1c, and the rest of the plurality of third light source units 119b_2 may be electrically connected to the second coupling unit CU2c.

Figure 14:
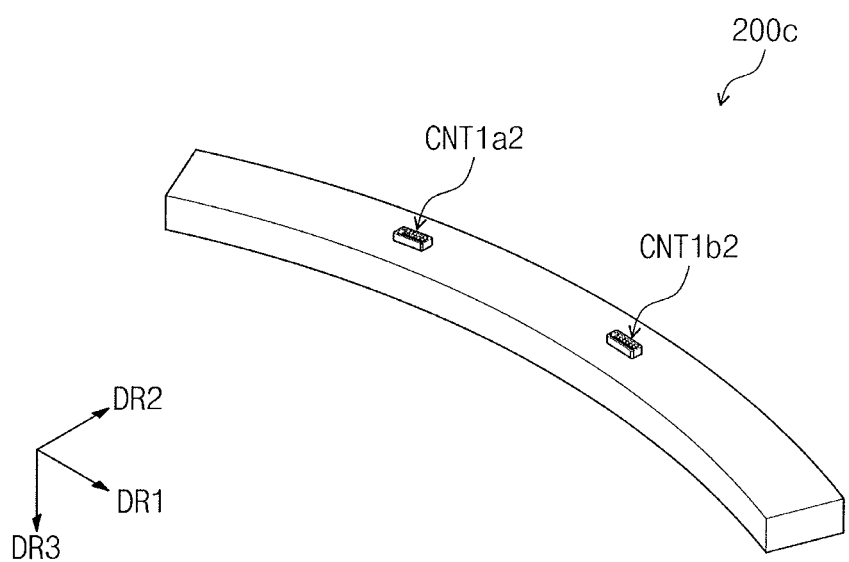
FIG. 14 illustrates a schematic perspective view of a cradle according to an embodiment.

FIG. 14 is a perspective view schematically illustrating a cradle according to an embodiment. Although it was exemplarily described that a groove is formed in the above described cradle and the display module is coupled to the groove, embodiments are not limited thereto.

For example, as illustrated in FIG. 14, a cradle 200c may not include a groove and connectors CNT1a2 and CNT1b2 may be provided on the top surface in parallel with a plane defined by the first direction DR1 and the second direction DR2. In FIG. 14, an example in which two connectors CNT1a2 and CNT1b2 are provided is presented, but embodiments are not limited thereto. The number of the connectors CNT1a2 and CNT1b2 may be more than two, or may be one. The connectors CNT1a2 and CNT1b2 may be fixed on a cradle 200c, or rotate on the cradle 200c.

The cradle 200c may be coupled to not only display modules having various sizes, but also display modules having various shapes. For example. the cradle 200c may be coupled to a display module curved in the opposite direction to a direction in which the cradle 200c is curved. and may also be coupled to a flat display module. In addition, the cradle 200c may be coupled to display modules having various curvatures. Further, the cradle 200c may be coupled to display modules having varying widths, e.g., not limited to those having a width less than or equal to that of a groove in the cradle.

In FIG. 14, the cradle 200c having a curved shape with a predetermined curvature is illustrated by way of example, but embodiments are not limited thereto. For example, the cradle 200c may have a rod shape extending in the first direction DR1, or may be modified into various shapes such as a plate shape, a disk shape, and a polygonal shape.

Inside a housing of the cradle 200c, a first light source driving circuit and a second light source driving circuit are disposed. When the display module having a first size is coupled to the cradle, the first light source driving circuit may output the first driving voltage to the first light source unit inside the display module having the first size. In addition, when the display module having a second size larger than the first size is coupled to the cradle, the first light source driving circuit may output the first driving voltage to the second light source unit inside the display module having the second size, and the second light source driving circuit may output the second driving voltage to the third light source unit inside the display module having the second size.

The second light source driving circuit may be electrically connected to or disconnected from the light source unit depending on the size of the display module coupled to the cradle 200c. Accordingly, the size of the display module coupled to the cradle 200c may not be limited to a single size. Thus, a user may use the display module by choosing any one of the display modules having various sizes and coupling the display module to the cradle 200c.

The processing units of the embodiments described herein may be implemented in logic which, for example, may include hardware, software, or both. When implemented at least partially in hardware, the processing units may be, for example, any of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processing units may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A cradle, comprising:
a housing to be coupled to display modules having various sizes; and
a light source driver inside the housing, the light source driver to generate a first driving voltage and second driving voltage, wherein
the display modules include a first display module having a first size and a second display module having a second size, larger than the first size,
the first display module includes a first display panel to display an image and a first light source to supply light to the first display panel,
the second display module includes a second display panel displaying an image, a second light source to supply light to the second display panel, and a third light source to supply light to the second display panel, and wherein
when the first display module is inserted into the housing, the light source driver operates in a first mode in which the first driving voltage is output to the first light source, and
when the second display module having a second size, larger than the first size, is inserted into the housing, the light source driver operates in a second mode in which the first driving voltage is output to the second light source and the second driving voltage is output to the third light source.

2. The cradle as claimed in claim 1, wherein, the light source driver includes a first light source driving circuit to generate the first driving voltage and a second light source driving circuit to generate the second driving voltage.

3. The cradle as claimed in claim 2, wherein, when operating in the first mode, an output terminal of the second light source driving circuit is opened.

4. The cradle as claimed in claim 2, further including a first connector electrically connected to the first light source driving circuit and the second light source driving circuit, wherein the first and second driving voltages are to be transmitted to respective light source through the first connector.

5. The cradle as claimed in claim 2, further including:
a first connector, electrically connected to the first light source driving circuit, to transmit the first driving voltage to the first light source or the second light source; and
a second connector, electrically connected to the second light source driving circuit, to transmit the second driving voltage to the third light source.

6. The cradle as claimed in claim 2, further including:
a first connector electrically connected to the first light source driving circuit and the second light source driving circuit; and
a second connector electrically connected to the first light source driving circuit and the second light source driving circuit.

7. The cradle as claimed in claim 2, wherein the first light source driving circuit and the second light source driving circuit are on the same printed circuit board.

8. The cradle as claimed in claim 2, wherein the first light source driving circuit is on a first printed circuit board, and the second light source driving circuit is on a second printed circuit board, separate from the first printed circuit board.

9. The cradle as claimed in claim 8, wherein the second printed circuit board is detachably coupled to the housing.

10. The cradle as claimed in claim 2, wherein the first light source driving circuit and the second light source driving circuit receive a same enable signal.

11. The cradle as claimed in claim 2, wherein,
the light source driver further includes a determination unit to receive a size information signal from the display module coupled to the housing and to generate a first enable signal and a second enable signal in accordance with the size information signal,
the first light source driving circuit to receive the first enable signal to output the first driving voltage, and
the second light source driving circuit to receive the second enable signal to output the second driving voltage.

12. The cradle is claimed in claim 1, wherein the light source driver further includes a determination unit to receive a size information signal from the display module inserted into the housing.

13. A cradle, comprising:
a housing configured to be coupled to a display module including a light source;
a first light source driving circuit inside the housing, the first light source driving circuit to output a first driving voltage to the light source;
a second light source driving circuit inside the housing, the second light source driving circuit is not to output a second driving voltage to the light source when the display module has a first size, and is to output the second driving voltage to the light source when the display module has a second size larger than the first size; and
a determination unit to receive a size information signal from the display module when it is inserted into the housing and to control the second light source driving circuit in accordance with the size information signal.

14. the cradle as claimed in claim 13, further including:
a connector electrically connected to the first light source driving circuit and the second light source driving circuit, wherein,
when the display module has the first size, the light source is electrically connected to the first light source driving circuit, and the light source is electrically disconnected from the second light source driving circuit, and
when the display module has the second size, a first part of the light source is electrically connected to the first light source driving circuit, and a second part of the light source is electrically connected to the second light source driving circuit.

15. A display device, comprising:
a display module including a display panel to display an image and a light source to supply light to the display panel; and
a cradle which switches between a coupled state in which the cradle is coupled to the display module and an uncoupled state in which the cradle is uncoupled from the display module, and includes a light source driver to generate a first driving voltage and a second driving voltage, wherein,
the display device operates, according to a size of the display module, in either a first mode in which the second driving voltage is output to the light source or a second mode in which the second driving voltage is not output to the light source, and
the light source driver includes a first light source driving circuit to generate the first driving voltage and a second light source driving circuit to generate the second driving voltage, wherein the second light source driving circuit is electrically connected to the light source in the first mode and is electrically disconnected from the light source in the second mode.

16. The display device as claimed in claim 15, wherein the display module is either of a first display module which has a first size and includes a first light source, or a second display module which has second size, larger than the first size, and includes a second light source and a third light source.

17. The display as claimed in claim 16, wherein, while the first display module is coupled to the cradle, the display is in the second mode in which the first light source driving circuit outputs the first driving voltage to the first light source, and the second light source driving circuit is electrically disconnected from the first light source.

18. The display device as claimed in claim 16, wherein, while the second display module is coupled to the cradle, the first light source driving circuit is electrically connected to the second light source to output the first driving voltage to the second light source, and the second light source driving circuit is electrically connected to the third light source to output the second driving voltage to the third light source.

19. The display as claimed in claim 16, wherein the first light source driving circuit is on a first printed circuit board, the second light source driving circuit is disposed on a second printed circuit board, separate from the first printed circuit board, and the second printed circuit board is detachably coupled to the cradle.

20. The display device as claimed in claim 16, wherein the second light source and the third light source are disposed on a single printed circuit board.

21. The display device as claimed in claim 16, wherein the second light source is on a first printed circuit board, and the third light source is disposed on a second printed circuit board, separate from the first printed circuit board.

22. The display device as claimed in claim 15, wherein the display module has any one of a flat shape and a curved shape.

23. The display device as claimed in claim 15, wherein the display module is inserted into the cradle, and wherein the light source driver further includes a determination unit to receive a size information signal from the display module when it is inserted into the cradle.

* * * * *